(12) United States Patent
Shimizu

(10) Patent No.: US 8,521,368 B2
(45) Date of Patent: Aug. 27, 2013

(54) ELECTRIC POWER STEERING DEVICE

(75) Inventor: Yoshinobu Shimizu, Sakai (JP)

(73) Assignee: JTEKT Corporation, Osaka-shi (JP)

( * ) Notice: Subject to any disclaimer, the term of this patent is extended or adjusted under 35 U.S.C. 154(b) by 417 days.

(21) Appl. No.: 12/920,998

(22) PCT Filed: Mar. 5, 2009

(86) PCT No.: PCT/JP2009/054131
§ 371 (c)(1),
(2), (4) Date: Sep. 3, 2010

(87) PCT Pub. No.: WO2009/110533
PCT Pub. Date: Sep. 11, 2009

(65) Prior Publication Data
US 2011/0015828 A1 Jan. 20, 2011

(30) Foreign Application Priority Data
Mar. 6, 2008 (JP) .............................. P.2008-055692

(51) Int. Cl.
| | | |
|---|---|---|
| B62D 6/00 | (2006.01) |
| B62D 5/04 | (2006.01) |
| B62D 11/00 | (2006.01) |
| B62D 12/00 | (2006.01) |
| B60K 1/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |
| G06F 19/00 | (2011.01) |
| H02P 1/00 | (2006.01) |

(52) U.S. Cl.
USPC ............. 701/43; 903/903; 318/440; 180/443; 180/65.26

(58) Field of Classification Search
USPC ...... 701/41–44, 36; 180/443–446, 65.1–65.8; 318/440, 489; 340/507; 708/530; 714/2; 903/903, 907
See application file for complete search history.

(56) References Cited

U.S. PATENT DOCUMENTS 4,828,060 A * 5/1989 Drutchas et al. ............... 180/404
4,837,690 A * 6/1989 Morishita et al. ............... 701/43

(Continued)

FOREIGN PATENT DOCUMENTS

JP   6 191418       7/1994
JP   06191418   *   7/1994

(Continued)

OTHER PUBLICATIONS

Extended European Search Report Issued Oct. 22, 2012 in European Patent Application No. 09716891.8.

(Continued)

*Primary Examiner* — Khoi Tran
*Assistant Examiner* — Abby Lin
(74) *Attorney, Agent, or Firm* — Oblon, Spivak, McClelland, Maier & Neustadt, L.L.P.

(57) ABSTRACT

There is provided a controller for a steering device that makes it possible to prevent sudden ceasing of steering assisting power by effectively utilizing an auxiliary power source. An electric power steering device that generates steering assist force by a motor includes a battery for supplying electric power to the motor, an auxiliary power source that supplies the motor with electric power, and a control circuit for controlling a power supply to the motor. In the event of a breakdown of the battery, the control circuit adjusts a power supply to the motor from the auxiliary power source according to an amount of energy remaining in the auxiliary power source so as to reduce steering assist force.

5 Claims, 5 Drawing Sheets

(56) References Cited

U.S. PATENT DOCUMENTS

| | | | |
|---|---|---|---|
| 4,869,334 A * | 9/1989 | Marumoto et al. | 180/446 |
| 5,758,741 A | 6/1998 | Tomioka | |
| 6,068,078 A | 5/2000 | Rau et al. | |
| 6,330,498 B2 * | 12/2001 | Tamagawa et al. | 701/22 |
| 2003/0233179 A1 | 12/2003 | Matsubara et al. | |
| 2008/0177444 A1 | 7/2008 | Tachibana et al. | |
| 2008/0211441 A1 | 9/2008 | Nagase | |

FOREIGN PATENT DOCUMENTS

| | | |
|---|---|---|
| JP | 8 107696 | 4/1996 |
| JP | 8 127355 | 5/1996 |
| JP | 2000 16320 | 1/2000 |
| JP | 2000 16321 | 1/2000 |
| JP | 2003 137115 | 5/2003 |
| JP | 2003 320942 | 11/2003 |
| JP | 2004 17732 | 1/2004 |
| JP | 2005 67414 | 3/2005 |
| JP | 2005-287222 | 10/2005 |
| JP | 2007-1324 A | 1/2007 |
| JP | 2007 112345 | 5/2007 |
| JP | 2007 210365 | 8/2007 |
| JP | 2008 213611 | 9/2008 |
| JP | 2009 40224 | 2/2009 |
| JP | 2009 61844 | 3/2009 |
| WO | WO 2007/066487 A1 | 6/2007 |

OTHER PUBLICATIONS

Office Action issued Feb. 29, 2012, in Chinese Patent Application No. 200980107881.4 (with English-language translation).

Chinese Office Action issued Nov. 20, 2012, in Patent Application No. 200980107881.4 (with English-language translation).

Office Action issued Feb. 26, 2013, in Japanese Patent Application No. 2008-055692 with English translation.

* cited by examiner

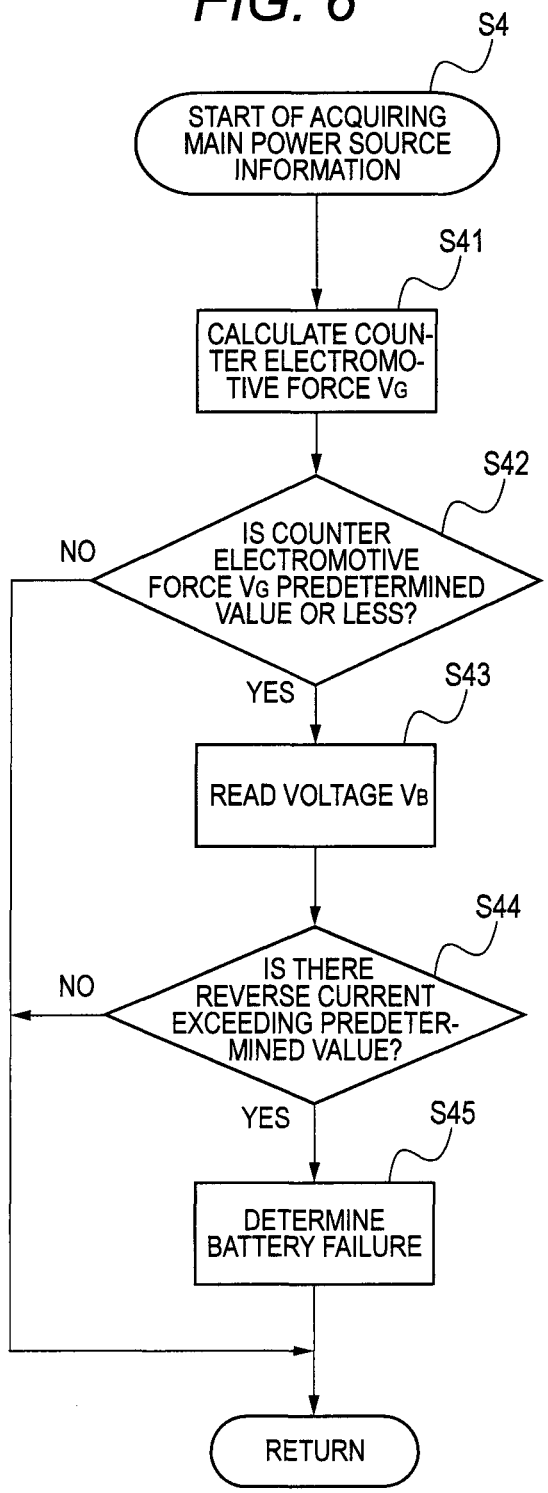

ELECTRIC POWER STEERING DEVICE

TECHNICAL FIELD

The present invention relates to an electric power steering device that controls a motor to generate steering assist force and, more particularly, a configuration of an electric circuit of the electric power steering device.

BACKGROUND ART

The applicant has already proposed an electric power steering device that enables performance of steering assist operation for a short period of time in the event of a breakdown of a battery (Japanese patent application No. 2007-52263).

The electric power steering device has an auxiliary power source connected in series with a battery. The electric power steering device has a detector for detecting an output from the battery, a charging/discharging circuit, and a control circuit. The charging/discharging circuit charges the auxiliary power source by the battery and selectively brings about a first output state for supplying the motor with electric power according to an output voltage of the battery and a second output state for supplying the motor with the electric power according to an output voltage acquired in a state that the auxiliary power source is connected in series with the battery. The control circuit selects the output state of the charging/discharging circuit in accordance with required steering assist force. The control circuit selects the second output state when a breakdown of the battery is detected on the basis of a detection result from the detector, thereby supplying the motor with electric power by the output voltage of the auxiliary power source.

When the breakdown of the battery is detected, the control circuit selects the second output state of the charging/discharging circuit, thereby controlling the auxiliary power source to supply electric power to the motor. Consequently, even if the battery has broken down, the auxiliary power source would generate required steering assist force for a short period of time, so that operation of the electric power steering device can be maintained.

DISCLOSURE OF THE INVENTION

Problem that the Invention is to Solve

Incidentally, in such an electric power steering device, when an assisted state is continuously provided by the auxiliary power source for a comparatively long period of time or a steering operation requiring large steering assist force (assisting force), or the like is continued, power supply may cease as a result of exhaustion of the auxiliary power source. When power source suddenly ceases, the assisting force provided thus far disappears. As a result, a driver feels discomfort that a steering operation becomes suddenly heavy.

For prevention of such thing, a conceivable method is to gradually diminish the assisting force with a given gradient or over a given period of time. However, the method is required to diminish the assisting force in view of the worst conditions (e.g., possible current values corresponding to each of vehicle speeds) so as to prevent depletion of the assisting force in the course of gradual decrease of the assisting power. In some cases, extra power in the auxiliary power source is left so that effective utilization of the auxiliary power source might not be accomplished.

The present invention solves such a problem and aims at providing an electric power steering device that enables effective utilization of the auxiliary power source by gradual decrease of an assisting force according to a remaining energy level of the auxiliary power source.

Means for Solving the Problem

An electric power steering device of the present invention is an electric power steering device for generating steering assist force by a motor, including a battery for supplying electric power to a motor, an auxiliary power source that supplies the motor with electric power, and a control circuit that controls a power supply to the motor. In the event of a breakdown of the battery, the control circuit adjusts a power supply to the motor from the auxiliary power source in accordance with an amount of energy remaining in the auxiliary power source so as to gradually reduce the steering assist force.

When a breakdown of the battery is detected, the electric power steering device of the present invention adjusts the power supply from the auxiliary power source to the motor according to the amount of energy remaining in the auxiliary power source so as to gradually reduce the steering assist force. It is thereby possible to prevent a steering wheel from suddenly feeling heavy, that would otherwise arise when a power supply from the auxiliary power source has suddenly ceased. As a consequence, the driver is prevented from feeling discomfort during steering operation, and assisting operation (steering assist operation) can be stopped without inflicting a shock to the driver. Moreover, since the power supply to the motor is gradually reduced according to the amount of energy remaining in the auxiliary power source, the energy charged in the auxiliary power source can effectively be utilized.

Preferably, the control circuit calculates an amount of initial charged energy of the auxiliary power source based on a voltage of the auxiliary power source at a time when a backup is initiated by the auxiliary power source, calculates the amount of remaining energy by subtracting an amount of consumed energy of the auxiliary power source from the amount of initial charged energy, and multiplies a reference assist value, that is acquired when the battery is unbroken, by a gain that is determined by dividing the amount of remaining energy by the amount of initial charged energy, to reduce the steering assist force. In this case, the steering assist force is gradually reduced according to a gain that is determined by dividing the amount of energy remaining in the auxiliary power source (a value determined by subtracting the amount of consumed energy from the amount of initial charged energy) by the amount of initial charged energy. Specifically, the steering assist force is gradually reduced by multiplying the reference assist value, that is acquired when the battery is not faulty, by the gain. Therefore, it is possible to prevent steering wheel from suddenly feeling heavy, that would otherwise arise when the power supply from the auxiliary power source has suddenly ceased.

Preferably, the control circuit calculates an amount of initial charged energy of the auxiliary power source based on a voltage of the auxiliary power source at a time when a backup is initiated by the auxiliary power source, calculates the amount of remaining energy by subtracting an amount of consumed energy of the auxiliary power source from the amount of initial charged energy, and multiplies a reference assist value, that is acquired when the battery is unbroken, by a reduction value that corresponds to a gain determined by dividing the amount of remaining energy by the amount of initial charged energy to reduce the steering assist force, and the reduction value being previously stored in a storage section of the control circuit in association with the gain. In this case, the steering assist force is gradually reduced according to a reduction value corresponding to a gain that is determined by dividing the amount of energy remaining in the auxiliary power source by the amount of initial charged energy. Specifically, the steering assist force is gradually reduced by multiplying the reference assist value, that is acquired when the battery is not faulty, by the reduction value. Therefore, it is possible to prevent steering wheel from suddenly feeling heavy, that would otherwise arise when the power supply from the auxiliary power source has suddenly ceased.

Advantage of the Invention

The electric power steering device of the present invention makes it possible to prevent sudden ceasing of steering assisting power while effectively utilizing the auxiliary power source.

BRIEF DESCRIPTION OF THE DRAWINGS

FIG. 6 is a flowchart showing a processing for determining a breakdown of a battery.

DESCRIPTIONS OF THE REFERENCE NUMERALS AND SYMBOLS

1 ELECTRIC POWER STEERING DEVICE
4 MOTOR
7 BATTERY
8 RELAY CONTACT
11 BACKUP POWER SOURCE
12 AUXILIARY POWER SOURCE
23 CONTROL CIRCUIT
28 BREAKDOWN DETECTOR
29 VOLTAGE DETECTOR
30 VOLTAGE DETECTOR
100 CHARGING CIRCUIT
200 DISCHARGING CIRCUIT
300 CHARGING/DISCHARGING CIRCUIT
400 CONTROL POWER SOURCE CIRCUIT

BEST MODE FOR CARRYING OUT THE INVENTION

Figure 1:
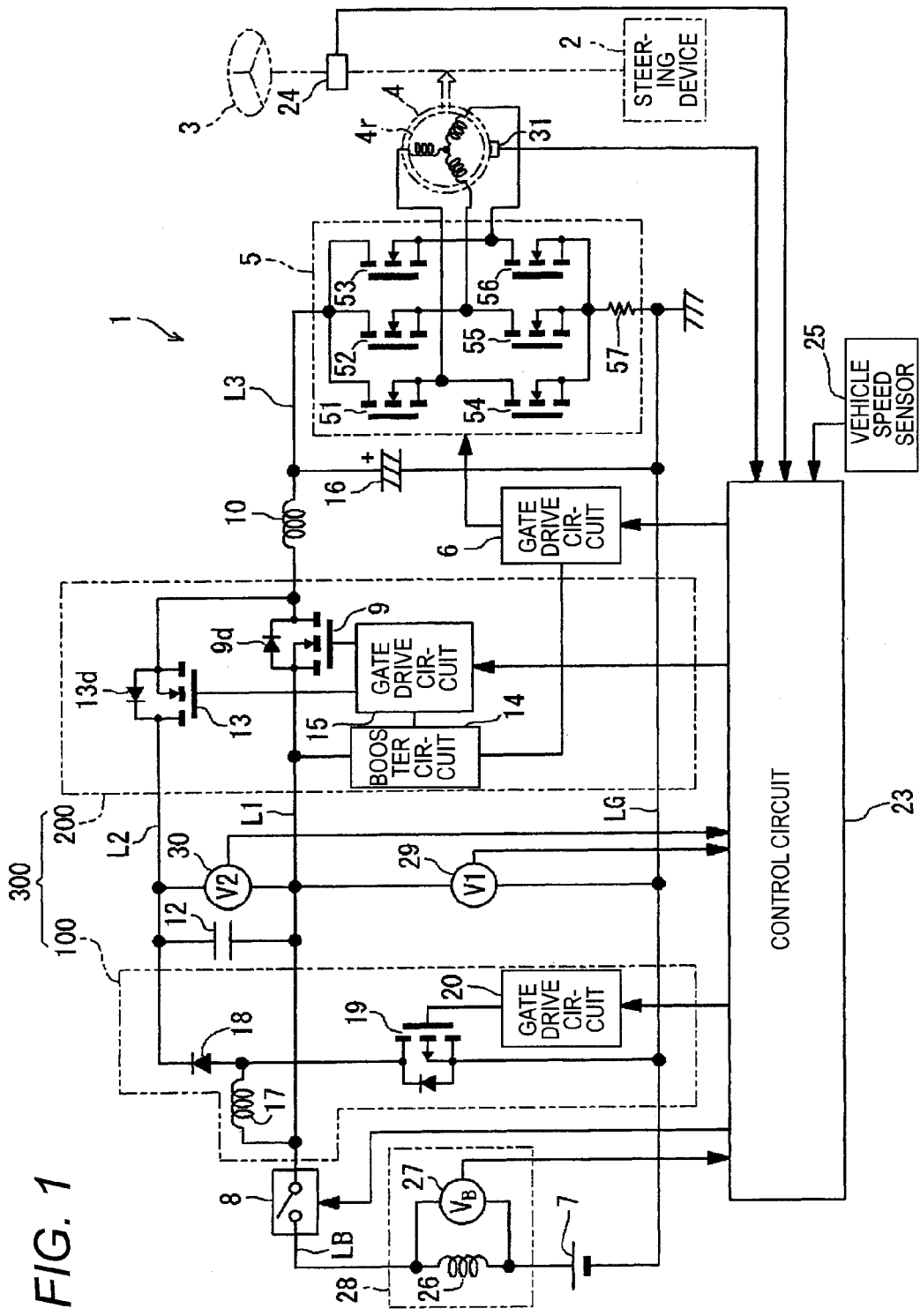
FIG. 1 is a circuit diagram of an electric power steering device according to an embodiment of the present invention.

FIG. 1 is a circuit diagram showing a configuration including primarily of an electric circuit of an electric power steering device 1 according to an embodiment of the present invention. In FIG. 1, a steering device 2 is actuated by driver's steering torque applied to a steering wheel (a driver's wheel) 3 and steering assist force generated by a motor 4. A reduction gear (not shown) is used for transmitting power from a rotor 4r of the motor 4 to the steering device 2. The motor 4 is a three-phase brushless motor and driven by a motor drive circuit 5. The motor drive circuit 5 is configured by connecting MOS-FETs 51 to 56, that make up a three-phase bridge circuit, with a resistor 57 as illustrated. The MOS-FETs 51 to 56 are switched by a gate drive circuit (an FET driver) 6.

A battery 7 serves as a main power source and supplies the motor drive circuit 5 with electric power. A reactor 26 is connected in series with the battery 7, and a voltage detector 27 is connected in parallel to the reactor 26. The reactor 26 is a low resistive element that causes a voltage drop proportional to an electric current flowing through the battery 7. A resistance value of the reactor is very small, and the voltage drop is negligibly small when compared with a normal voltage of the battery 7. The reactor 26 and the voltage detector 27 configure a detector 28 that detects an output (an electric current) of the battery 7.

A voltage derived from the battery 7 through the reactor 26 is led to the motor drive circuit 5 and the motor 4 by way of electric lines L1 and L3. A relay contact 8, a MOS-FET 9, and a reactor 10 are inserted in the lines L1 and L3. The MOS-FET 9 is an N channel type and connected so that a source of the MOS-FET 9 is connected to a portion of circuitry including the battery 7 and that a drain of the MOS-FET 9 is connected to a portion of circuitry including the motor drive circuit 5. A parasitic diode 9d is provided so that an electric current flows in a forward direction through the parasitic diode when electric power is supplied from the battery 7 to the motor 4.

An auxiliary power source 12 includes an electrical double layer capacitor, a lithium ion battery, or the like, and is connected in series with the battery 7 in this embodiment. A high voltage side electric line L2 of the auxiliary power source 12 is connected to a node between the drain of the MOS-FET 9 and the reactor 10, by way of a MOS-FET 13. An output voltage (a voltage of the electric line L2) acquired while the battery 7 and the auxiliary power source 12 are connected in series with each other is led to the motor drive circuit 5 and the motor 4 by way of the electric lines L2 and L3 in which the MOS-FET 13 and the reactor 10 are inserted. The MOS-FET 13 is an N channel type and connected so that a source of the MOS-FET 13 is connected to a portion of circuitry including the motor drive circuit 5 and that a drain of the MOS-FET 13 is connected to a portion of circuitry including the auxiliary power source 12. A parasitic diode 13d is oriented in a direction opposite to a flowing direction of an electric current when electric power is supplied to the motor 4 from the battery 7 and the auxiliary power source 12.

The electric line L1 applied with the voltage from the battery 7 is connected to a booster circuit (a bootstrap circuit) 14, and an output voltage of the booster circuit 14 is applied to gate drive circuits 6 and 15. The gate drive circuit 15 activates the MOS-FETs 9 and 13 so as alternately to turn on. A smoothing electrolytic capacitor 16 is connected in parallel to the motor drive circuit 5.

An anode of a diode 18 is connected to the electric line L1 through a reactor 17. A cathode of the diode 18 is connected to the high voltage side electric line L2 of the auxiliary power source 12. A p-channel MOS-FET 19 is interposed between an anode of the diode 18 and a ground side electric line LG. The MOS-FET 19 is activated by a gate drive circuit 20. A charging circuit 100 of the auxiliary power source 12 is configured by these elements (17 to 20).

Along with the charging circuit 100, a discharging circuit 200 including the MOS-FETs 9 and 13 configures a charging/discharging circuit 300. The charging/discharging circuit 300 is configured so as to select between a first output state in which the auxiliary power source 12 is charged in accordance with the battery 7 and electric power is supplied to the motor 4 by the output voltage of the battery 7 and a second output state in which electric power is supplied to the motor 4 by an output voltage acquired when the auxiliary power source 12 is connected in series with the battery 7.

The motor drive circuit 5, the gate drive circuits 6, 15, and 20, and the relay contact 8 operate upon receipt of a command signal from a control circuit 23 including a microcomputer. An output signal from a torque sensor 24 that detects the steering torque applied to the steering wheel 3 is input to the control circuit 23. An output signal from a vehicle speed sensor 25 that detects vehicle speed is also input to the control circuit 23. The motor 4 is equipped with an angle sensor 31 that detects a rotational angle position of the rotor 4r, and an output signal from the angle sensor 31 is input to the control circuit 23.

The voltage detector 27 connected in parallel to the reactor 26 detects a voltage $V_B$ proportional to the electric current flowing through the battery 7 and delivers an output signal (a battery current detection signal) to the control circuit 23. The voltage $V_B$ reverses in sign between a case where the electric current exits from the battery 7 and a case where the electric current enters the battery 7. Therefore, the direction of the electric current as well as its magnitude can also be detected.

A voltage detector 29 is connected in parallel to the battery 7, and a voltage detector 30 is connected in parallel to the auxiliary power source 12. The voltage detector 29 connected in parallel to the battery 7 detects a voltage V1 of the battery 7 and delivers its output signal to the control circuit 23. The voltage detector 30 connected in parallel to the auxiliary power source 12 detects a voltage (a terminal-to-terminal voltage) V2 of the auxiliary power source 12 and delivers its output signal to the control circuit 23.

The control circuit 23 activates the motor drive circuit 5 through the gate drive circuit 6 and also drives the motor 4 in order to generate appropriate steering assist force in accordance with a steering torque signal sent from the torque sensor 24, a vehicle speed signal sent from the vehicle speed sensor 25, and a rotor angle position signal sent from the angle sensor 31.

The relay contact 8 normally remains in an ON (closed) state in accordance with the command signal from the control circuit 23. Therefore, the voltage from the battery 7 is applied to the electric line L1.

Meanwhile, when the MOS-FET 19 is in an ON state, an electric current flows from the battery 7 by way of the reactor 17 and the MOS-FET 19. When the MOS-FET 19 changes to an OFF state in this condition, a high voltage of opposite direction develops in the reactor 17 so as to hinder a change in a magnetic flux caused by a current shutoff, whereupon the auxiliary power source 12 is charged, by way of the diode 18, with a voltage generated as a result of boosting of the output voltage from the battery 7. The auxiliary power source 12 can be charged by repeated activation and deactivation of the MOS-FET 19. The control circuit 23 monitors the voltage V2 of the auxiliary power source 12. When the voltage V2 has not reached a given voltage level, the control circuit 23 activates and deactivates the MOS-FET 19 by way of the gate drive circuit 20, thereby charging the auxiliary power source 12. Charging operation is performed; for instance, when the torque sensor 24 does not detect steering torque.

The control circuit 23 estimates, from the steering torque and the vehicle speed, required electric power for generating required steering assist force and compares the thus-estimated electric power with a reference value. When the required electric power is equal to or smaller than the reference value, the control circuit 23 brings the MOS-FET 9 into an ON state and the MOS-FET 13 into an OFF state (the first output state of the charging/discharging circuit 300). Accordingly, the voltage from the battery 7 is smoothed by the smoothing capacitor 16, and the thus-smoothed voltage is supplied to the motor drive circuit 5. In accordance with the control signal from the control circuit 23, the motor drive circuit 5 drives the motor 4. In this case, the electric power of the auxiliary power source 12 is not supplied to the motor drive circuit 5. ON resistance of the N-channel MOS-FET 9 is considerably smaller than forward resistance of a parasitic diode 9d (e.g., 1 mΩ or thereabouts). Therefore, the majority of the electric current flowing from the battery 7 into the motor drive circuit 5 passes from the source to the drain of the MOS-FET 9, and an electric current flowing through the parasitic diode 9d is very small.

In the meantime, when the required electric power exceeds the reference value; namely, when the required electric power cannot be met solely by the battery 7 or when the burden on the battery 7 becomes greater, the control circuit 23 brings the MOS-FET 9 into an OFF state and the MOS-FET 13 into an ON state (the second output state of the charging/discharging circuit 300). As a consequence, an output voltage is supplied to the motor drive circuit 5 while the battery 7 and the auxiliary power source 12 are connected in series with each other. High electric power exceeding the electric power that can be output solely by the battery 7 can be supplied to the motor drive circuit 5. A cathode of the parasitic diode 9d of the MOS-FET 9 is potentially higher than an anode of the same; namely, the cathode has a reverse voltage, so that flowing of the electric current from the auxiliary power source 12 to the battery 7 is hindered.

As mentioned above, there is performed control operation for selecting either only the battery 7 or the combination of the battery 7 with the auxiliary power source 12, according to required electric power.

By the above circuit configuration, the electric power steering device of the present invention adjusts the electric power supplied to the motor 4 according to an amount of energy remaining in the auxiliary power source 12 when electric power required for steering assist operation is supplied to the motor 4 by use of the auxiliary power source 12 in the event of a battery breakdown.

More specifically, a power supply is gradually reduced so that the steering assist force becomes smaller as the amount of remaining energy is smaller.

Figure 3:
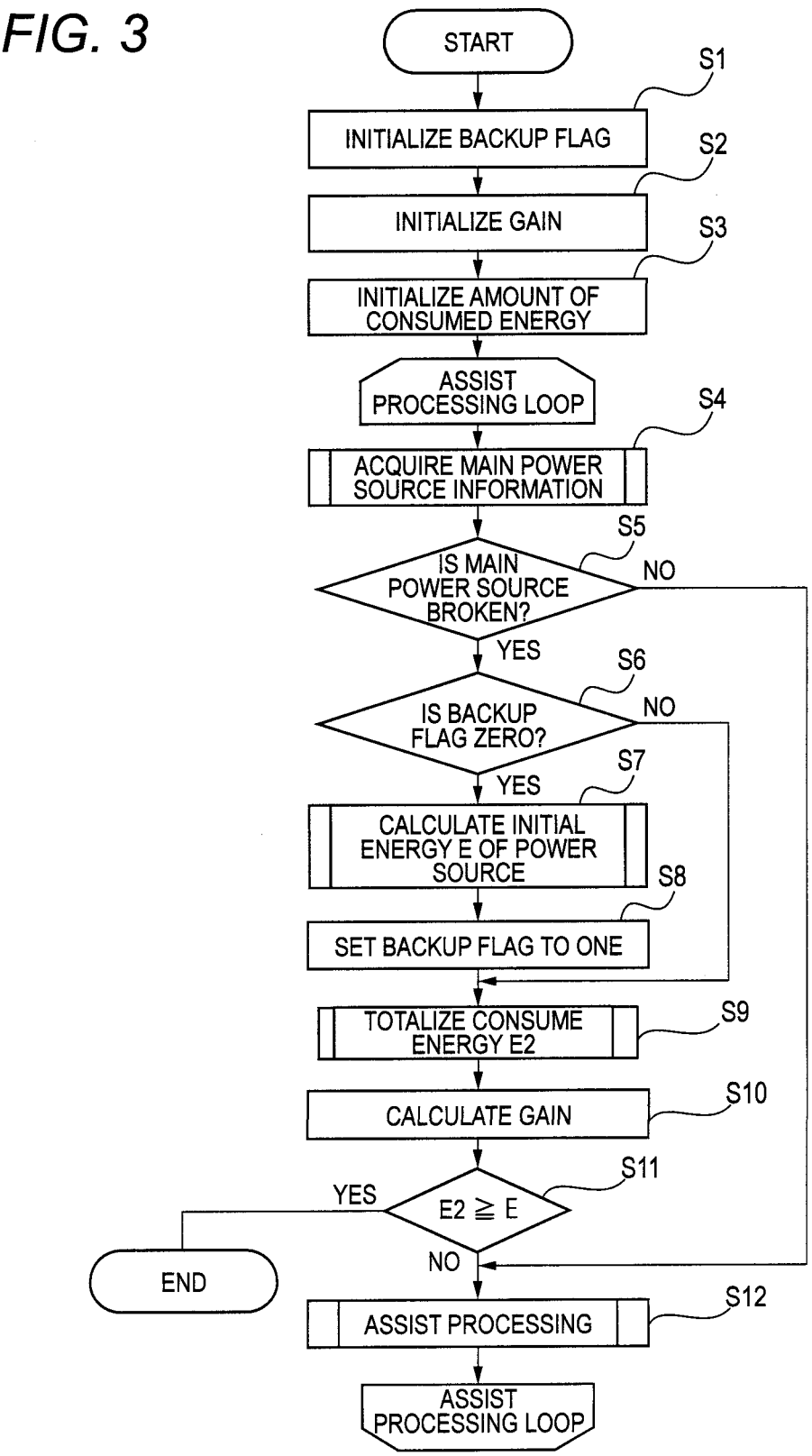
FIG. 3 is a flowchart showing an assist processing.

FIG. 3 is a flowchart showing an assist processing for supplying the motor 4 with electric power required to assist steering operation. First, in step S1, the control circuit 23 initializes a flag pertaining to whether or not the auxiliary power source 12 is performing a backup of the battery 7 (a backup flag=0). Next, in step S2, the control circuit 23 initializes a ratio of energy remaining in the auxiliary power source 12 (a ratio of an amount of remaining energy to an amount of initial energy); namely, a gain. Energy is not used at the outset, and a gain assumes a value of 100%. Therefore, the ratio is initialized to one.

Next, in step S3, the control circuit 23 initializes consumed energy of the auxiliary power source 12. Energy is not consumed at the beginning, and hence the energy consumption is initialized to zero.

The control circuit then enters a loop for controlling assist processing. In step S4, the control circuit 23 acquires main power source information about whether or not the battery 7 serving as a main power source is inoperative. The control circuit 23 determines, in step S5, whether or not the battery 7 is faulty (inoperative). When it is determined that the battery is faulty, the control circuit proceeds a processing to step S6. On the contrary, when it is determined that the battery is not faulty, the control circuit proceeds a processing to step S12.

In step S6, the control circuit 23 determines whether or not a backup system is established. Specifically, it is determined whether or not the backup flag is set to "0." When the backup flag is determined not to be set to "0" (i.e., the backup system is already established), the control circuit lets processing proceed to step S9. In the meantime, when the backup flag is determined to be set to "0" (the backup system is not established), the control circuit lets processing proceeds to step S7. In step S7, the control circuit 23 calculates an amount of initial energy stored in the auxiliary power source 12 at the beginning of backup operation. Specifically, the control circuit 23 calculates an amount of initial energy E of the auxiliary power source 12 from voltage information from the voltage detector 30.

In step S8, the control circuit 23 then sets the backup flag to "1." The amount of initial energy E of the power source is thereby calculated for only the beginning of the backup system.

In step S9, the control circuit 23 totalizes amounts of consumed energy E2 of the auxiliary power source 12 for assisting steering operation. Next, in step S10, the control circuit calculates a gain G. The gain G is calculated by (E−E2)/E; in other words, the gain can be determined by dividing the amount of remaining energy, that is a value obtained by subtracting the amount of consumed energy E2 from the amount of initial energy E of the power source, by the amount of initial energy E of the power source.

In step S11, the control circuit 23 determines whether or not the amount of consumed energy E2 is equal to or greater than the amount of initial energy E of the power source. When the amount of consumed energy E2 is equal to or greater than the amount of initial energy E of the power source (Yes), the control circuit stops assist processing. When the amount of consumed energy E2 is less than the amount of initial energy E of the power source (No), the control circuit proceeds a processing to step S12, and assist processing is performed in step S12.

During assist processing pertaining to step S12, steering assistance is performed in accordance with a value that is determined by multiplying by the gain; for instance, a magnitude (an assist command value or a reference assist value) of required electric power that is estimated from steering torque and vehicle speed and that is intended to acquire required steering assist force. The words "assist command value" and "reference assist value" refer to a magnitude of electric power supplied to the motor 4 solely from the battery 7 or from a power source, that is a combination of the battery 7 with the auxiliary power source 12, to assist steering operation when the battery 7 is not faulty. In the present invention, when the battery 7 is not faulty, No is rendered as a determination in step S5. Normal assist processing, such as that mentioned previously, is performed in step S12. Since the gain achieved in this case is "1," required electric power, that is estimated from steering torque and vehicle speed and that is intended to acquire required steering assist force, is supplied to the motor 4. On the contrary, in the event of a breakdown of the battery 7, the motor 4 is supplied with electric power in accordance with a value obtained by decreasing the assist command value or the reference assist value according to the amount of remaining energy.

Figure 4:
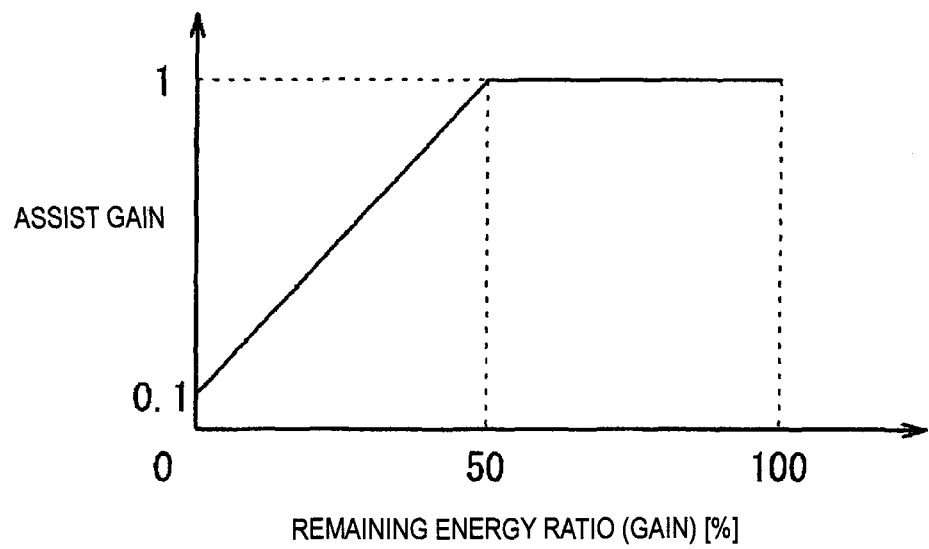
FIG. 4 is a graph showing an example assist gain map commensurate with a remaining energy ratio.

The magnitude of steering assist can also be determined by multiplying an assist gain (a reduction value) determined from a map, such as that shown in FIG. 4, by the assist command value as well as by multiplying the assist command value by a gain. In FIG. 4, a horizontal axis represents a gain obtained in step S10, whilst a vertical axis represents an assist gain (a reduction value) set according to the gain. In an example shown in FIG. 4, the assist gain is linearly reduced such that the assist gain assumes a value of "1" in a range where the gain changes from 0.5 to 1 and that the assist gain assumes a value of "0.1" at a gain of "0" in a range where the gain changes from 0 to 0.5. Steering assistance similar to that performed when the battery is unbroken is performed before the amount of remaining energy comes to one-half the amount of initial energy. At a point in time when the amount of remaining energy comes to one-half the amount of initial energy, the steering assist force is gradually reduced according to the amount of remaining energy.

Figure 5:
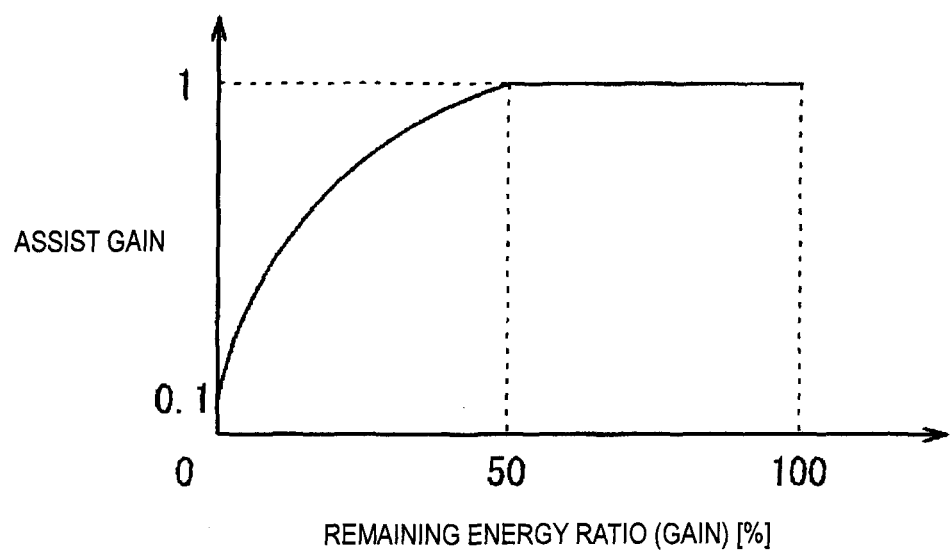
FIG. 5 is a graph showing another example assist gain map commensurate with a remaining energy ratio.

The assist gain can also be determined from a map, such as that shown in FIG. 5, instead of the map shown in FIG. 4. In an example shown in FIG. 5, the assist gain is set to "1," like the example shown in FIG. 4, in the range where the gain changes from 0.5 to 1. However, in the range where the gain changes from 0 to 0.5, the assist gain is reduced so as to follow an upwardly-raised curve. In this case, steering assist force can smoothly be reduced when compared with the case shown in FIG. 4. Specifically, steering assistance is gradually reduced at first, and a reduction rate is increased as the amount of remaining energy is smaller, whereby driver's discomfort attributable to a reduction in steering assistance can be lessened.

In view of an increase in the degree of freedom for setting steering assist force, operation for determining an assist gain from the map shown in FIGS. 4 and 5 and multiplying the assist command value by the assist gain is more preferable than operation for multiplying the assist command value by the gain determined in step S10 without modifications. It is also possible to represent a relationship between a gain and an assist gain as a mathematical expression and determine an assist gain by means of the mathematical expression.

Acquisition of the main power source information pertaining to step S4 is now described by reference to a flowchart shown in FIG. 6. The flowchart is example processing for determining whether or not the battery 7 has broken down. The control circuit 23 repeatedly performs processing. First, the control circuit 23 differentiates an angle position signal, that is input by the angle sensor 31, by means of a time in step S41, thereby determining rotational speed ω[rad/sec] of the motor 4 (the rotor 4r). The rotational speed is multiplied by a counter electromotive voltage constant Ke that has previously been determined through actual measurement, thereby calculating counter electromotive force $V_G$; namely, $V_G$=Ke·ω.

After computation, the control circuit 23 determines whether or not the counter electromotive force $V_G$ is a predetermined value or less (step S42). When the motor 4 rotates at high speed, counter electromotive force exceeds a voltage of the battery 7, and an electric current originating from the counter electromotive force occasionally (reversely) flows into the battery 7. However, this backflow is not an abnormal. Therefore, an appropriate predetermined value that is lower than the voltage of the battery 7 must be set so as not to perform failure determination processing in such a case. Accordingly, when the counter electromotive force $V_G$ exceeds the predetermined value, the control circuit 23 terminates (aborts) determination processing. On the contrary, when the counter electromotive force $V_G$ is the predetermined value or less, the dontrol circuit 23 reads the voltage $V_B$ output from the voltage detector 27 (step S43).

The control circuit 23 determines, from the magnitude and sign of the voltage $V_B$, whether or not a reverse current exceeding another predetermined value (that is irrelevant to the predetermined value described in connection with step S42) flows into the battery 7 (step S44). The predetermined value is set by estimating or actually measuring a value of an electric current flowed to the battery from the outside as a result of a breakdown of the battery 7. When the magnitude of the reverse current is the predetermined value or less, determination processing ends. When the magnitude of the reverse current exceeds the predetermined value, the control circuit 23 determines that the battery 7 is broken (step S45) and performs processing for a battery failure.

Specifically, upon detection of a battery failure, the control circuit 23 brings the MOS-FET 9 into an OFF state and the MOS-FET 13 into an ON state (the second output state of the charging/discharging circuit 300). As a consequence, electric power is supplied to the motor 4 by means of the voltage output from the auxiliary power source 12. Even when the voltage of the battery 7 is lost, required electric power can thereby be supplied to the motor 4 only for a short period of time. Therefore, in the event of a breakdown of the battery 7, required steering assist force can be generated to park the vehicle at a safety location.

As mentioned above, in the electric power steering device 1 of the present embodiment, the control circuit 23 selects the second output state of the charging/discharging circuit 300 when detected a breakdown of the battery 7, thereby supplying the motor 4 with electric power by means of an output voltage obtained when the auxiliary power source 12 is connected in series with the battery 7. Accordingly, in the event of a breakdown of the battery 7, required steering assist force can be generated by the auxiliary power source 12 only for a short period of time, so that operation of the electric power steering 1 can be maintained.

Figure 2:
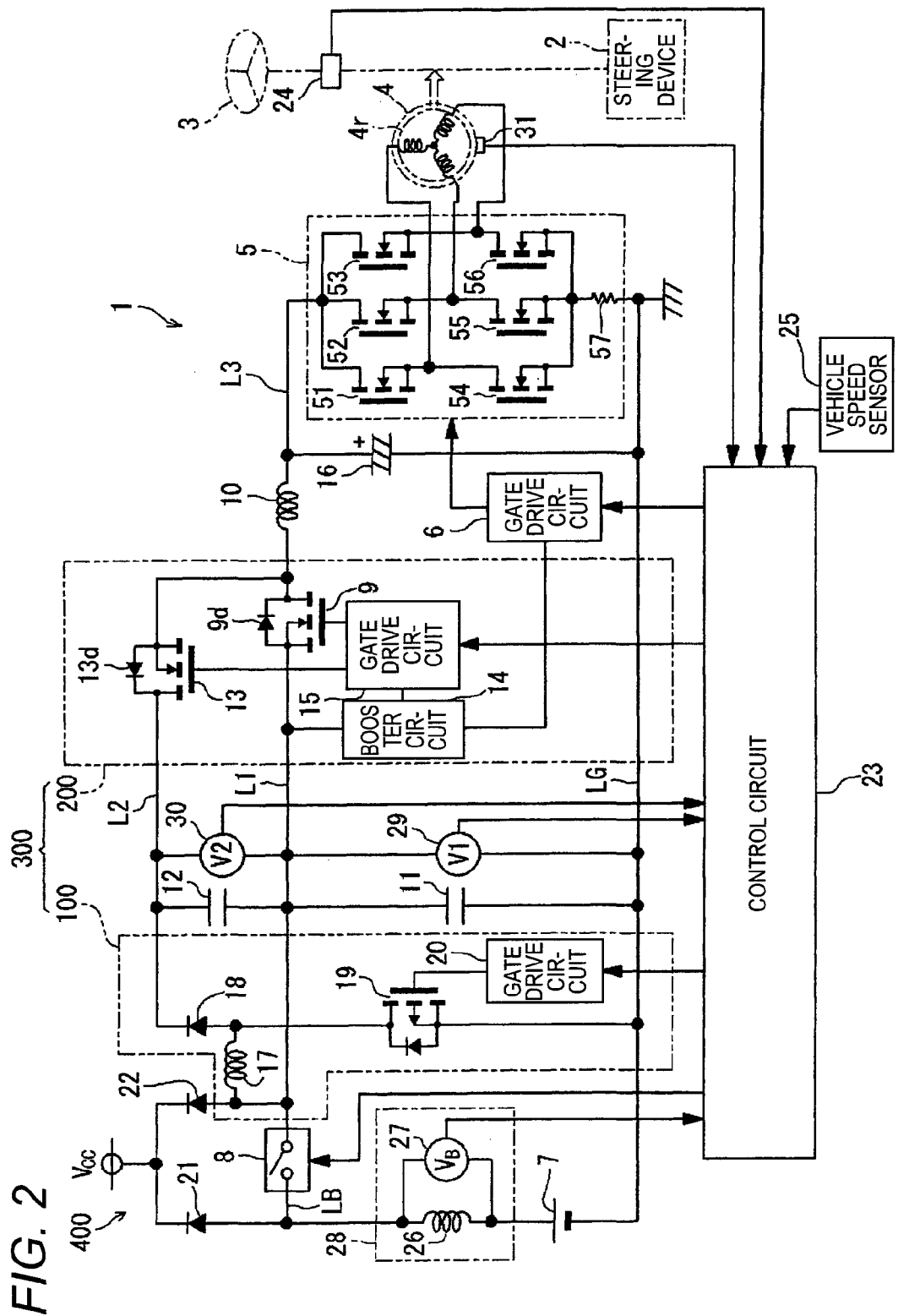
FIG. 2 is a circuit diagram of an electric power steering device according to another embodiment of the present invention.

FIG. 2 shows a circuit diagram of the electric power steering device of another embodiment of the present invention. In the present embodiment, a backup power source 11 and the battery 7 are arranged in parallel to each other. The auxiliary power source 12 is connected in series with a parallel combination including the backup power source 11 and the battery 7. In FIG. 2, elements and a configuration that are identical with that described in connection with the embodiment shown in FIG. 1 are assigned the same reference numerals as those shown in FIG. 1. For the sake of brevity, their explanations are omitted.

The backup power source 11 is configured by an electric double layer capacitor or a lithium battery, the backup power source 11 is connectable in parallel to the battery 7. In a strict sense, the backup power source is not connected in parallel to the battery 7 but connected in parallel to a circuit in which the battery 7 is connected in series with the reactor 26. However, a voltage drop developing in the reactor 26 is small as mentioned previously. Therefore, it can be understood that the backup power source 11 is substantially connected in parallel to the battery 7. Moreover, a positive-side electric line LB of the battery 7 and a positive-side electric line (the electric line L1) of the backup power source 11 are connected to each other by way of the relay contact 8 serving as an openable/closable and controllable switch.

In the circuit configuration shown in FIG. 2, the voltage originating from the battery 7 comes into a control power source Vcc by way of a diode 21. The voltage originating from the backup power source 11 also comes into the control power source Vcc by way of a diode 22. A control power source circuit 400 having two power systems is thus configured. When the relay contact 8 is closed, the battery 7 and the backup power source 11 are connected in parallel to each other and contribute, as a single unit, to provision of the control power source Vcc. However, when the relay contact 8 is open, the battery 7 and the backup power source 11 are independent of each other, to thus enter a state where they can supply the control power source Vcc.

In the embodiment shown in FIG. 2, when the breakdown of the battery 7 is detected, the control circuit 23 brings the relay contact 8 into an OFF (open) state. The control power voltage Vcc is not supplied from the broken battery 7 but from the backup power source 11. The control power voltage Vcc supplied to the control circuit 23 and other circuit elements requiring the control power voltage Vcc is thereby maintained.

When the relay contact 8 remains closed in the event of a breakdown of the battery 7, a potential of the electric line LB where the voltage has dropped affects the control power voltage Vcc, and the reverse current keeps flowing from the backup power source 11 to the battery 7. However, the relay contact 8 is opened in the event of the breakdown of the battery 7, whereby the influence of the broken battery 7 is immediately eliminated, so that the control power voltage Vcc can reliably be supplied from the backup power source 11.

In the control power source circuit 400 described in connection with the embodiment, the relay contact 8 is used as an openable/closable and controllable switch. However, a semiconductor switching element, such as a MOS-FET, can also be used instead of the relay contact.

In the embodiment, on the occasion of a determination as to whether or not the auxiliary power source 12 is used for supplying electric power to the motor 4, the control circuit 23 estimates electric power required to generate required steering assist force and compares the thus-estimated electric power with a reference value. Another way to make a determination is also possible. For instance, the electric current supplied to the motor drive circuit 5 changes according to required steering assist force, by means of assist control operation performed by the control circuit 23, the gate drive circuit 6, and the motor drive circuit 5. The voltage of the battery 7 and the electric current supplied to the motor drive circuit 5 are actually detected, and they are multiplied, to thus determine the current electric power. When the current electric power is the maximum electric power, that is acquired when electric power is supplied solely from the battery 7, or less, the electric power is supplied solely from the battery 7. When the current electric power exceeds the maximum electric power, the electric power may also be supplied from a series power source consisting of the battery 7 and the auxiliary power source 12.

The present patent application is based on Japanese Patent Application (Japanese patent application No. 2008-055692) filed on Mar. 6, 2008, the entire subject matter of which is incorporated herein by reference.

Industrial Applicability

It is possible to provide an electric power steering device capable of effectively utilizing an auxiliary power source by gradually reducing assist force according to an amount of energy remaining in the auxiliary power source.

The invention claimed is:

1. An electric power steering device for generating a steering assist force by a motor, comprising:
   a battery for supplying the motor with electric power;
   an auxiliary power source that supplies the motor with electric power; and
   a control circuit that controls a power supply to the motor, wherein the control circuit
      adjusts the power supply to the motor from the auxiliary power source in accordance with an amount of energy remaining in the auxiliary power source so as to reduce the steering assist force in the event of a breakdown of the battery;
      calculates an amount of initial charged energy of the auxiliary power source based on a voltage of the auxiliary power source at a time when a backup is initiated by the auxiliary power source;

calculates the amount of remaining energy by subtracting an amount of consumed energy of the auxiliary power source from the amount of initial charged energy; and multiplies a reference assist value, that is acquired when the battery is unbroken, by a gain that is determined by dividing the amount of remaining energy by the amount of initial charged energy, to reduce the steering assist force.

2. The electric power steering device according to claim 1, wherein the control circuit further multiplies the reference assist value by a reduction value that corresponds to the gain the reduction value being previously stored in a storage section of the control circuit in association with the gain.

3. The electric power steering device according to claim 1, wherein the reference assist value includes a magnitude of required electric power estimated to be required to generate the steering assist force.

4. The electric power steering device according to claim 3, wherein the required electric power is estimated based upon at least one of a steering torque and a vehicle speed.

5. An electric power steering method for generating a steering assist force by a motor, comprising:

adjusting a power supply to the motor from an auxiliary power source in accordance with an amount of energy remaining in the auxiliary power source so as to reduce the steering assist force in the event of a breakdown of a battery;

calculating an amount of initial charged energy of the auxiliary power source based on a voltage of the auxiliary power source at a time when a backup is initiated by the auxiliary power source;

calculating the amount of remaining energy by subtracting an amount of consumed energy of the auxiliary power source from the amount of initial charged energy; and multiplying a reference assist value, that is acquired when the battery is unbroken, by a gain that is determined by dividing the amount of remaining energy by the amount of initial charged energy, to reduce the steering assist force.

* * * * *